G. A. WOOD.
CHUCK.
APPLICATION FILED APR. 10, 1915.
1,159,146.
Patented Nov. 2, 1915.
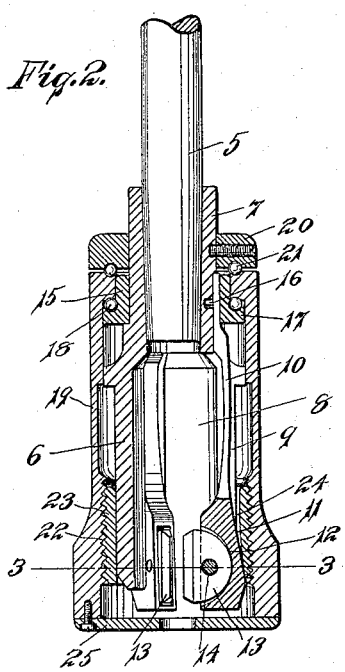
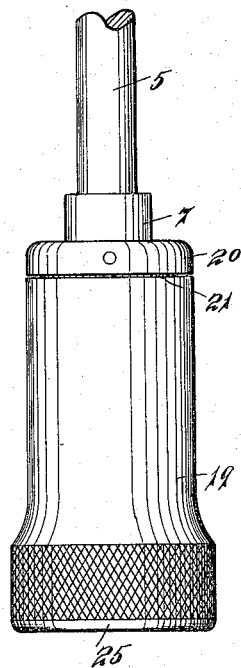
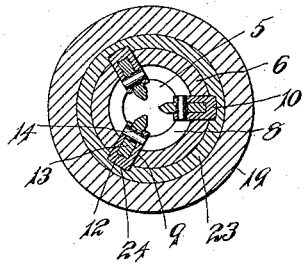
WITNESSES:
E. F. Eaton
W. E. O'Brien
INVENTOR.
George A. Wood.
BY
Arthur B. Jenkins,
ATTORNEY.

UNITED STATES PATENT OFFICE.

GEORGE A. WOOD, OF SOUTHINGTON, CONNECTICUT.

CHUCK.

1,159,146.   Specification of Letters Patent.   Patented Nov. 2, 1915.

Application filed April 10, 1915. Serial No. 20,445.

*To all whom it may concern:*

Be it known that I, GEORGE A. WOOD, a citizen of the United States, residing at Southington, in the county of Hartford and State of Connecticut, have invented a new and Improved Chuck, of which the following is a specification.

My invention relates more especially to that class of chucks commonly known as "drill chucks", and an object of my invention, among others, is to provide a chuck of this class, simple in construction, efficient in operation, and also one that will readily hold drills, the shanks of which may vary in size or in shape.

One form of device embodying my invention and in the construction and use of which the objects herein set out, as well as others, may be attained, is illustrated in the accompanying drawings, in which—

Figure 1 is a view in side elevation of a chuck embodying my invention. Fig. 2 is a view in central longitudinal section through the same. Fig. 3 is a view in cross section on plane denoted by line 3—3 of Fig. 2.

In the accompanying drawings the numeral 5 denotes the lower end of a drill spindle and 6 a chuck body that is secured to the spindle in any well known manner. A neck 7 extends from the chuck body, the spindle 5 being secured within an opening extending through the neck and body, this opening being counterbored, forming a recess 8 in the body extending from its lower end. Jaw slots 9 are formed radially in the body, extending into the recess 8, in the form herein shown there being three of these slots. Chuck jaws 10 are located within said slots, the upper ends or shanks of the jaws being secured to the neck 7, the structure of the jaws and attaching means therefor being such that they may have a radial movement within the body for the purpose of clamping or unclamping a drill or like tool. The lower ends of the jaws are enlarged and have beveled clamping surfaces 11 on their outer edge and gripper slots 12 on their inner surfaces. These slots 12 have a bottom of curved shape to receive grippers 13 having edges preferably formed on a curve of less radius than that of the bottom of the slots, so that the grippers may freely rock upon the bottom of the slots.

In the preferred form of construction pins extend through the walls of the slots and through openings 14 in the grippers, said openings being of a size somewhat larger than the pins so that free rocking movement of the grippers may be had. The chuck jaws 10 are composed of spring metal constructed to cause the jaws to normally spring away from each other.

A sleeve supporting collar 15 is located on the neck 7 outside of the ends or shanks of the chuck jaws, this collar being seated against a shoulder 4 on the chuck body. The shanks preferably have studs 16 on their under surfaces formed to enter holes in the neck, and the collar 15, holding the shanks with these studs in the openings, secure the chuck jaws in place. A flange 17 formed upon the collar has an annular groove to receive balls 18 and a clamping sleeve 19 surrounds the parts hereinabove described and has a shoulder overlying the flange 17 and resting upon the balls 18, a groove being formed in this shoulder if desired to receive the balls, which parts thus constitute a ball bearing. A collar 20 is secured to the neck 7 to hold the securing sleeve in place, a set screw being shown herein as a means for holding the collar, and a set of balls 21 may, if desired, be located between the collar and the end of the sleeve.

The lower end of the clamping sleeve is interiorly threaded as at 22 near its lower end and a clamping ring 23 provided with threads to fit those on the interior of the sleeve surround the chuck jaws opposite the clamping surfaces 11 thereon. Grooves 24 are formed upon the interior surface of the clamping ring in position to receive the chuck jaws 10, the ring being thus held from rotating upon the chuck body. Any other suitable means, however, for holding the ring against rotation may be employed. A cover plate 25 may be secured to the end of the sleeve to close the opening thereinto, this cover plate having a central opening to receive the shank of the drill or other tool.

It will be noted that the clamping sleeve is held against longitudinal movement on the chuck body, and the clamping ring is held against rotation on said body, with a result that, as the clamping sleeve is rotated, the ring is caused to move longitudinally and force the chuck jaws toward each other, or permit them to spring apart.

While I have shown and described herein a satisfactory arrangement of the parts comprising my improved chuck, this construction may be departed from to a greater or lesser degree and yet be within the spirit and intent of the invention, and I do not therefore limit myself to the exact construction herein shown and described except as defined by the appended claims.

I claim—

1. A chuck including a chuck body, chuck jaws secured to the body, a clamping sleeve rotatably supported by the body, the upper part of said sleeve having an interiorly projecting flange, means upon the chuck body to engage said flange on opposite sides to retain the sleeve in position, a clamping ring for operating the chuck jaws, said ring having a screw thread fitting the threaded inner surface of said sleeve, and means for holding said ring against rotation.

2. A chuck including a chuck body, chuck jaws secured to the body, a shoulder upon the body of a width to comprise one side of a raceway for balls, a clamping sleeve rotatably supported by the chuck body and having an interiorly projecting flange constituting the opposite side of said raceway, means for holding the sleeve against lengthwise movement on the chuck body, a clamping ring for operating the chuck jaws, said ring having a screw thread fitting the threaded inner surface of said sleeve, and means for holding said ring against rotation.

3. A chuck including a chuck body, chuck jaws secured to the body, a clamping sleeve rotatably supported by the chuck body, a flange projecting interiorly from one end of said sleeve, means projecting from the chuck body in position to receive said flange between them, balls located upon opposite sides of said flange and between said flange and the projecting means from said body, a clamping ring for operating the chuck jaws, said ring having a screw thread fitting the threaded inner surface of said sleeve, and means for holding said ring against rotation.

4. A chuck including a chuck body, chuck jaws supported by the body, a shoulder upon said body of a width to comprise one side of a raceway, a clamping sleeve having an interiorly projecting flange of a width to form the opposite side of said raceway, a collar secured to the chuck body, ball bearings located between said collar and flange and between said flange and shoulder, a clamping ring for operating the chuck jaws, said ring having a screw thread fitting the threaded inner surface of the sleeve, and means for holding said ring against rotation.

5. A chuck including a chuck body having opposing shoulders thereon forming an annular groove, ball bearings located in raceways on each of said shoulders, a clamping sleeve having an interiorly projecting flange located in said annular groove and resting against said ball bearings, chuck jaws secured to the chuck body and having clamping surfaces, a clamping ring surrounding the body and jaws to engage said clamping surface and having screw threads to engage the screw threaded inner surface of said clamping sleeve, and means for holding said ring against rotation.

6. A chuck including a chuck body having a shoulder, a clamping sleeve having an opening within which said shoulder may be received and an inwardly projecting flange to be located opposite said shoulder, ball bearings located between said flange and shoulder, a clamping collar removably secured to the body, ball bearings located between said flange and collar, chuck jaws secured to said body within said sleeve, a clamping ring arranged to operate the jaws and having a screw thread fitting the interior screw thread of the sleeve, and means for holding said ring against rotation.

7. A chuck including a chuck body, chuck jaws each having one end secured to the chuck body, a sleeve surrounding the ends of the chuck jaws to hold them in place, said sleeve having a shoulder, a clamping sleeve having an interiorly projecting flange to be located opposite the shoulder on the sleeve and be supported thereby, a clamping ring for operating the chuck jaws, said ring having a screw thread fitting the threaded inner surface of said sleeve, and means for holding said ring against rotation.

8. A chuck including a chuck body having a shoulder thereon, a supporting collar seated against said shoulder, chuck jaws having their ends secured by said collar to the chuck body, said collar having a shoulder, a clamping sleeve having an inwardly projecting flange to be supported by said shoulder, a clamping ring for operating the chuck jaws, said ring having a screw thread to fit the threaded inner surface of said sleeve, and means for holding the ring against rotation.

9. A chuck including a chuck body, chuck jaws secured to said body and having slots opening to the face of the jaws and closed at their sides and having curved bottoms, grippers movably located within said slots and having curved edges of less radius than said slots, and means for operating the chuck jaws.

GEORGE A. WOOD.

Witnesses:
ARTHUR B. JENKINS,
E. F. EATON.

Copies of this patent may be obtained for five cents each, by addressing the "Commissioner of Patents, Washington, D. C."